Patented Mar. 25, 1930

1,751,778

UNITED STATES PATENT OFFICE

CONWAY FREIHERR von GIRSEWALD AND HANS NEUMARK, OF FRANKFORT-ON-THE-MAIN, GERMANY

METHOD FOR MAKING ZINC FROM OXYGEN COMPOUNDS OF ZINC OR SUBSTANCES CONTAINING OXYGEN COMPOUNDS OF ZINC

No Drawing. Application filed October 12, 1928, Serial No. 312,205, and in Germany October 13, 1927.

This invention relates to a method for making zinc from oxygen compounds of zinc or substances containing such oxygen compounds, for example oxidic zinc ores.

The method according to the invention consists in reducing the oxygen compounds of zinc by the action of reducing agents, not leading to gaseous reaction products, at comparatively low temperatures preferably below 1000° C. and at reduced pressure; the liberated zinc is at the same time distilled off. Reducing agents for the purpose of the invention are metals such as iron, manganese, copper and the like. Especially adapted is the cheap iron, which may be used for example as powder or in spongeous form.

It has already been proposed to manufacture zinc by heating zinc blend in mixture with molten iron in presence of a solvent for the zinc ore. This method, which has to be carried out in the liquid phase at high temperatures for example 1100°C. and more, has, however, the disadvantage, that it is impossible to obtain a complete conversion of the reaction products.

It has further been proposed to manufacture volatile metals, such as zinc, from their sulfides or sulfide-oxide mixtures in an electrical furnace in presence of metallic iron, used as binding agent for the sulfur present, by distilling off the volatile metal after the sulfur of the raw material has been combined with the iron. The amount of iron necessary, corresponds to the amount of sulfur to be combined with the iron; for reducing the metal oxygen compounds present in the raw material corresponding amounts of carbon are added.

From this method the invention differs by the fact, that the oxidic raw material is treated with the metal for example iron powder in the solid phase at comparatively low temperatures for example at about 850° C., avoiding the presence of gas producing reducing agents such as carbon. The new method has the advantage, that the zinc obtained is of a high degree of purity, especially also practically free from lead and that the yields are nearly theoretical. As the reduction is not accompanied by formation of gases, there is no difficulty in maintaining the reduced pressure in the furnace, thus making it possible to work continuously. With the known method in which carbon is used as reducing agent, such results cannot be obtained, as it is necessary to remove continuously great amounts of gases produced by the reduction. Besides this the great dilution of the zinc vapor with carbon monoxide causes difficulties in the condensation of the zinc and decreases the zinc yields.

According to a special form of execution of the invention the amount of iron used is such, that magnetic $Fe_3O_4$ is formed. This method of operation has the advantage, that the formed $Fe_3O_4$ may be easily separated from the impurities such as lime, silica and the like by electro-magnetic separation. The purified $Fe_3O_4$ may be converted into spongeous iron by reduction and may be used again in the process.

Example 100 parts of an oxidic zinc ore containing 43.62% of Zn, 16.37% of Fe, 0.72% of Pb, 1.78% of Mn, and 1.31% of CaO are intimately mixed with 50 parts of iron powder; the mixture is heated to about 800–900° C., e. g. 850° C., in an electric vacuum furnace. The zinc oxide present in the raw material is converted into zinc according to the following formula:

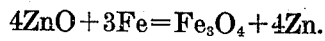

$$4ZnO + 3Fe = Fe_3O_4 + 4Zn.$$

The zinc distilling off is condensed at about 500° C. 41 parts of zinc containing 0.02% lead are obtained, an amount, which corresponds to a yield of about 95%. The remaining residue is worked up by electro-magnetic separation, thus obtaining 69 parts of magnetic iron oxide which may be reduced to metallic iron. The reduced iron may be used again in the process.

We claim:

1. A method for making zinc from oxygen compounds of zinc or substances containing oxygen compounds of zinc which consists in heating to moderate temperatures and at reduced pressure mixtures of the zinc containing raw materials with reducing metals and distilling off the zinc produced.

2. A method for making zinc from oxygen compounds of zinc or substances containing oxygen compounds of zinc which consists in heating to temperatures between 800 and 900° C. and at reduced pressure mixtures of the zinc containing raw materials with reducing metals and distilling off the zinc produced.

3. A method according to claim 1 in which metallic iron is used as reducing metal.

4. A method according to claim 1 in which disintegrated metallic iron is used as reducing metal.

5. A method according to claim 1 in which spongeous metallic iron is used as reducing metal.

6. A method according to claim 1 in which metallic iron in amounts sufficient for the formation of magnetic iron oxide as reaction product is used as reducing metal.

7. A method according to claim 1 in which metallic iron in amounts sufficient for the formation of magnetic iron oxide as reaction product is used as reducing metal and in which the magnetic iron oxide formed is recovered from the residue by electromagnetic separation, reduced to metallic iron and used again as reducing agent for further zinc containing raw materials.

In testimony whereof we affix our signatures.

Dr. CONWAY FREIHERR von GIRSEWALD.
Dr. HANS NEUMARK.